(12) United States Patent
Corduan et al.

(10) Patent No.: US 6,530,352 B2
(45) Date of Patent: Mar. 11, 2003

(54) INTAKE MANIFOLD OR DISTRIBUTOR WITH SEVERAL PIPES

(75) Inventors: Pascal Corduan, Walbach (FR); William Faucheux, Saint Gereon (FR)

(73) Assignee: Mark IV Systemes Moteurs (Societe Anonyme), Courbevoie (FR)

( * ) Notice: Subject to any disclaimer, the term of this patent is extended or adjusted under 35 U.S.C. 154(b) by 0 days.

(21) Appl. No.: 09/865,541

(22) Filed: May 29, 2001

(65) Prior Publication Data

US 2002/0124826 A1 Sep. 12, 2002

(30) Foreign Application Priority Data

May 26, 2000 (FR) .............................................. 00 06772

(51) Int. Cl.$^7$ ............................................ F02M 35/104

(52) U.S. Cl. ............................... 123/184.21; 123/184.61

(58) Field of Search ........................ 123/184.21, 184.61

(56) References Cited

U.S. PATENT DOCUMENTS

| 4,175,504 A | 11/1979 | Ederer et al. |
| 5,636,605 A | 6/1997 | Nomizo et al. |

FOREIGN PATENT DOCUMENTS

| EP | 0 992 674 | 4/2000 |

*Primary Examiner*—Paul J. Hirsch
(74) *Attorney, Agent, or Firm*—Young & Thompson

(57) ABSTRACT

The present invention has for its object an intake manifold or distributor with several pipes. Intake manifold or distributor (1), particularly of thermoplastic material, obtained by the assembly of at least two previously produced constituent parts (2 and 3) and comprising several intake pipes (4) formed with said manifold or distributor, characterized in that each intake pipe (4) is at least partially, and preferably totally, constituted by the coaction of at least one wall portion (6, 6'; 7, 7') of at least one of its constituent parts (2, 3) with the structural insert (8) mounted in one of said parts (2, 3) before their mutual assembly, held in position between them after their assembly and forming at least a portion of the wall of the pipe (4) in question.

16 Claims, 3 Drawing Sheets

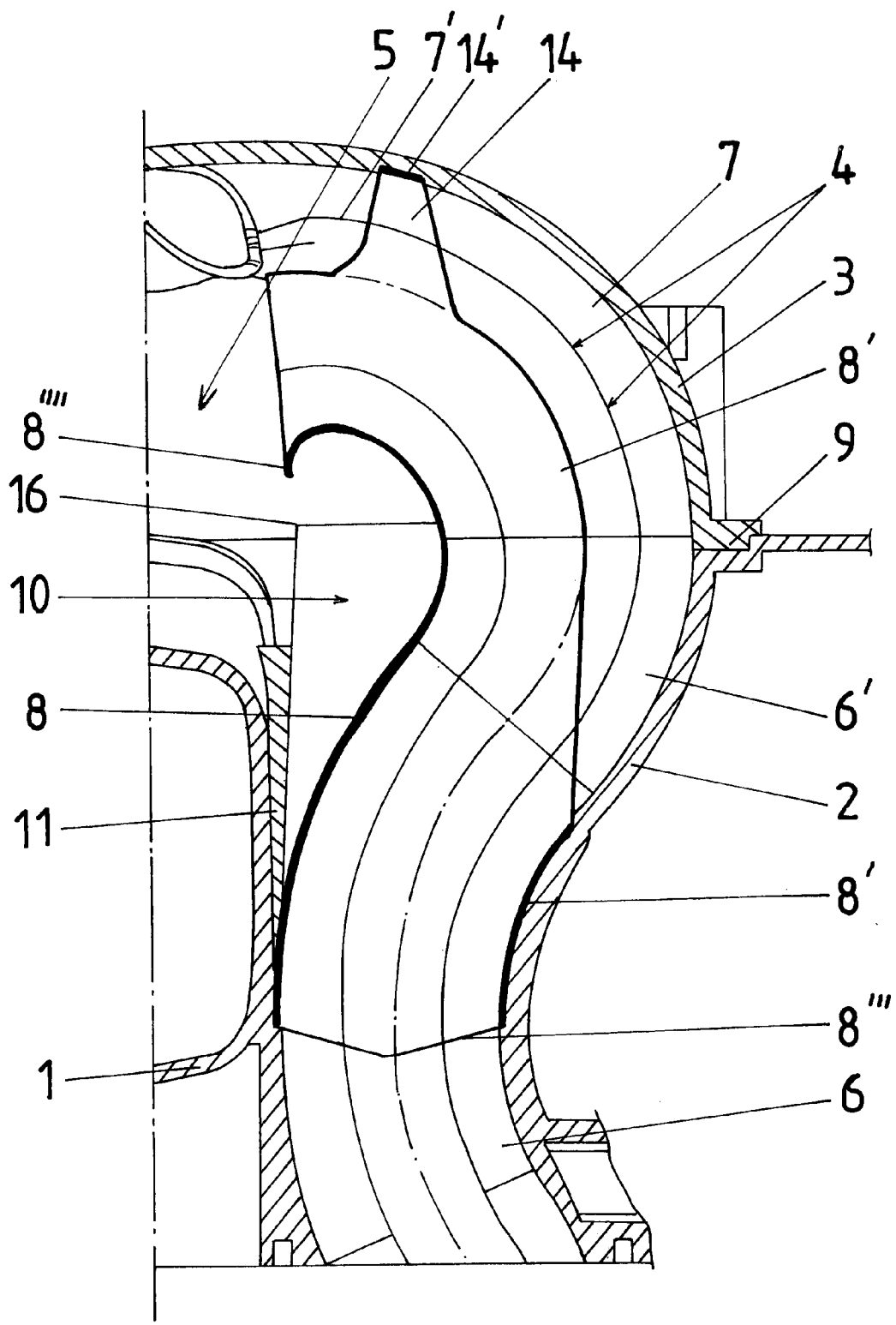
Fig_1

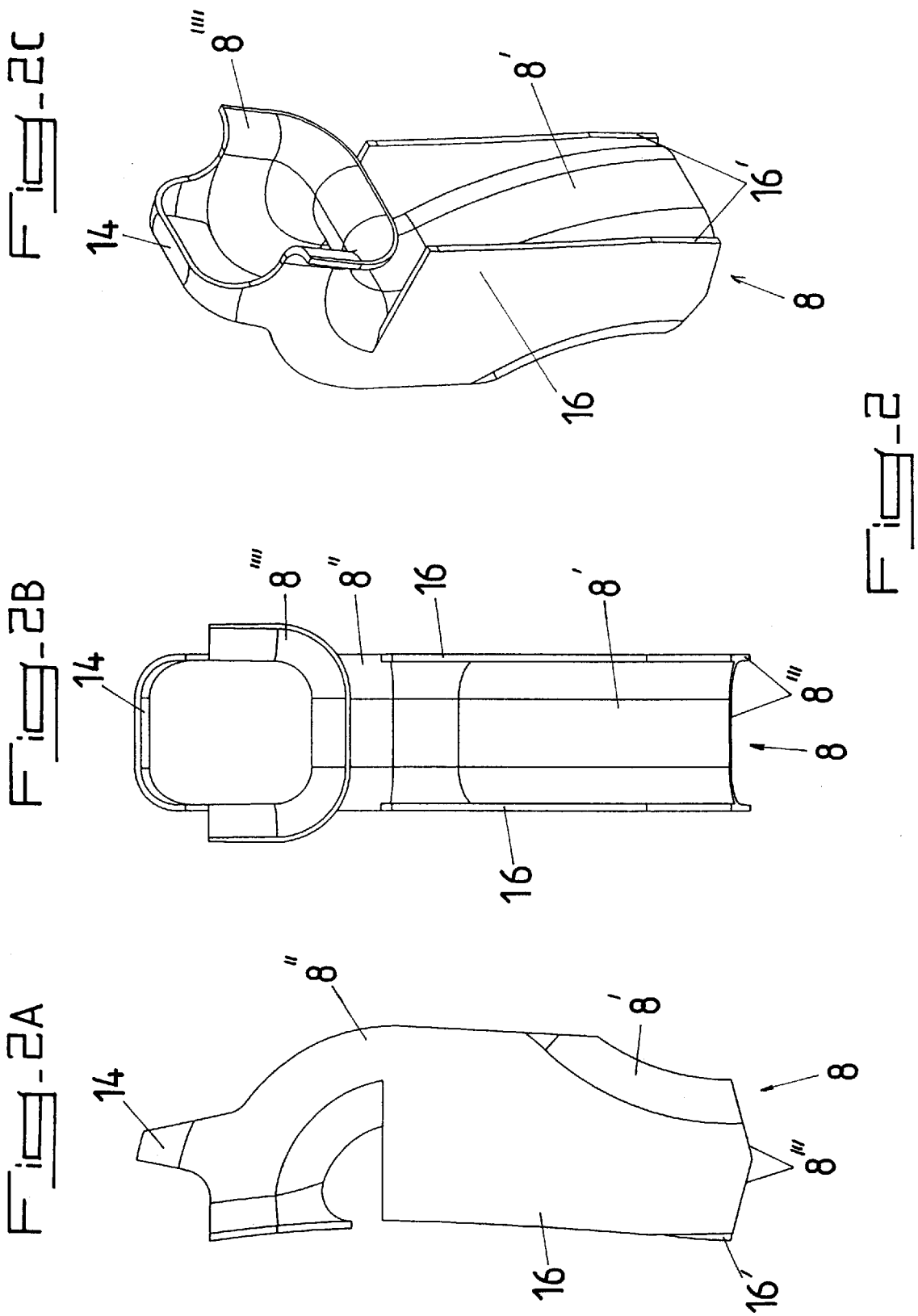

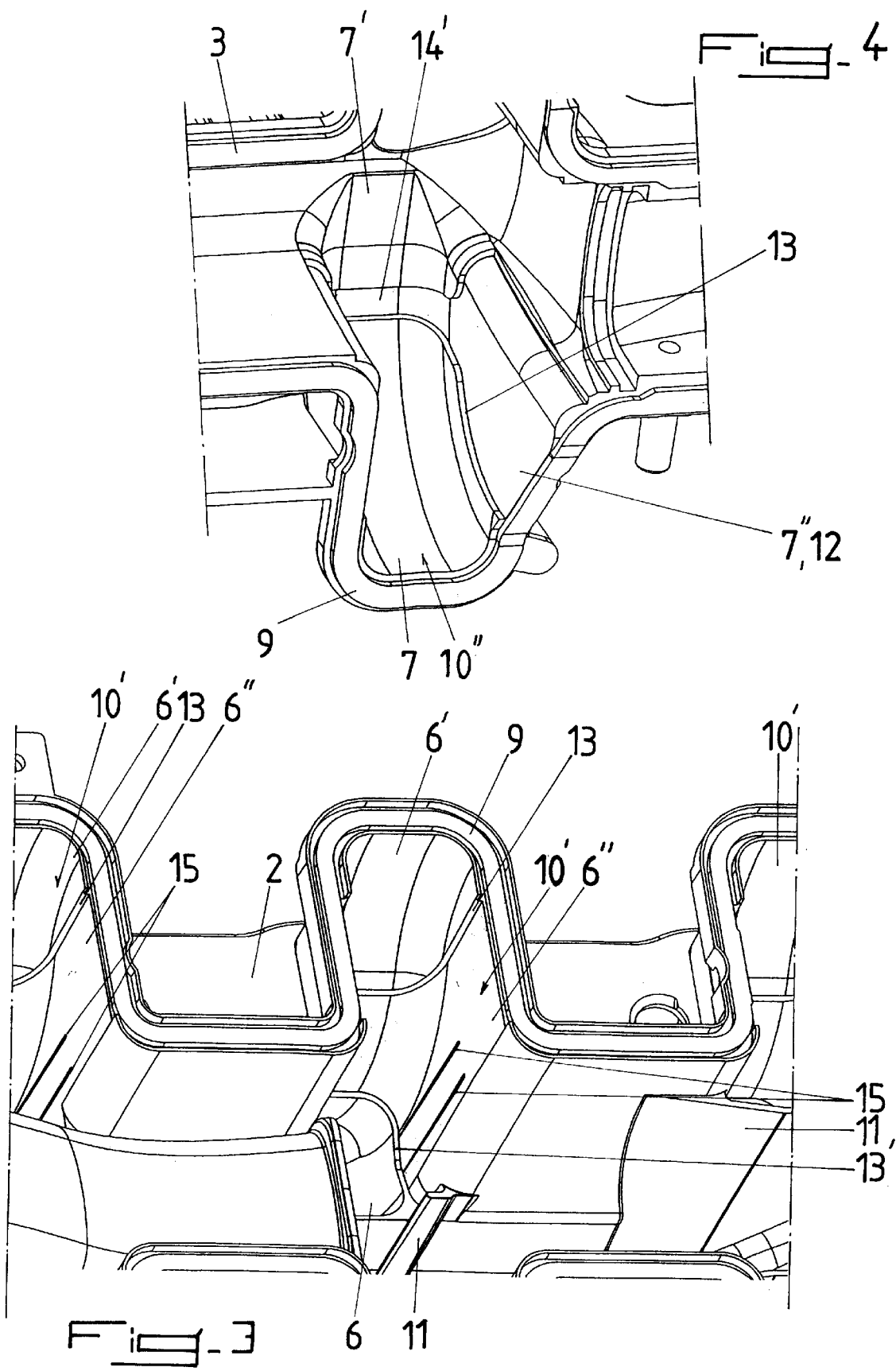

INTAKE MANIFOLD OR DISTRIBUTOR WITH SEVERAL PIPES

The present invention relates to the field of intake systems for air or gaseous mixtures into heat engines, and has for its object an intake manifold or distributor with several pipes, more simple to produce than present manifolds or distributors which have a construction of the same level of complexity.

At present, to produce intake manifolds or distributors with a complex internal structure, and particularly those including pipes or portions of pipes partially surrounding the chamber or plenum to save space, one generally proceeds by assembling two constituent portions with simpler structures assembled together by welding for example, particularly in the case of manifolds or distributors of thermoplastic material.

However, in most cases, even the production of the simpler constituent portions by molding can be delicate and require the use of complicated molds and molding processes, giving rise moreover to difficulty as to the shape of the two constituent portions which can lead to less than optimal solutions of the configurations of the joint planes, in terms of resistance to assembly and fluid tightness.

It is thus been proposed to subdivide the manifold or distributor into two portions (3 or 4) and to assemble them successively with each other to constitute said manifold or distributor. However, this latter in this case has, because of the numerous weld lines, a non-homogeneous structure and is subject to higher risks of failure of the seal, the assembly process being moreover also more difficult.

The present invention has particularly for its object to overcome the mentioned drawbacks and to provide a structure of a manifold or distributor formed if possible solely from two principal constituent portions to be assembled, said constituent portions having a structure and constitution relatively simple and easy to obtain by molding, particularly by injection molding.

To this end, it has for its object an intake manifold or distributor, particularly of thermoplastic material, obtained by the assembly of at least two preformed constituent portions and comprising several intake pipes formed with said manifold or distributor, characterized in that each intake pipe is at least partially and preferably totally constituted by the coaction of at least one portion of the wall of at least one of the constituent portions, with a structural insert, mounted in one of said portions before their mutual assembly, held in position between them after their assembly, and forming at least one portion of the wall of the pipe in question.

The invention will be better understood from the following description, which relates to a preferred embodiment, given by way of non-limiting example, and explained with reference to the accompanying schematic drawings, in which:

FIG. 1 is a fragmentary cross-sectional view of a manifold or distributor according to the invention, at the level of a pipe;

FIGS. 2A, 2B and 2C are respectively side elevational, front elevational and perspective views of an insert constituting a portion of the pipe shown in FIG. 1, to obtain a pipe with a rectangular cross-section and rounded corners;

FIG. 3 is a fragmentary perspective view from above of the lower portion of the manifold or distributor according to the invention, showing particularly a portion of a recess for receiving an insert, and, FIG. 4 is a view partially in perspective from below, of the upper portion of the manifold or distributor according to the invention, showing particularly a portion of a recess for receiving an insert, complementary to the recess portion shown in FIG. 3.

Thus, the invention relates to an intake manifold or distributor, particularly of thermoplastic material, obtained by the assembly of at least two preformed constituent portions and comprising several intake pipes formed with said manifold or distributor.

According to the invention, and as shown particularly in FIG. 1 and FIGS. 2 to 4 taken together, each intake pipe 4 is at least partially, and preferably totally, constituted by the coaction of at least one wall portion 6, 6'; 7, 7' of at least one of the constituent portions 2, 3 with a structural insert 8, mounted in one of said portions 2, 3 before their mutual assembly, held in position between them after their assembly, and forming at least one portion of the wall of the pipe 4 in question.

According to a preferred embodiment of the invention, the manifold or distributor is constituted by two parts, namely a lower part 2 and an upper part 3, assembled by welding at the level of a peripheral joint 9 belonging to one assembly surface, flat or not, this latter passing substantially transversely through the intake pipes 4 which extend into the two constituent parts 2 and 3, the walls of these latter forming reception recesses 10 for the inserts 8 and constituting a portion of the walls of said pipes 4, complementary to that formed by the insert 8.

The recesses 10 accordingly constitute partial preforms of the pipes 4 and provide particularly the external walls and a portion of the side walls of said pipes 4 (considered relative to their longitudinal axis and their curve), the opposite and complementary walls of said pipes being supplied by the inserts 8.

It will be noted that the arrangements described above permit, by acting simultaneously on the shapes of the inserts 8 and those of the lower and upper constituent portions 2 and 3, as well as their respective separation planes, tailoring of components of a simple shape, and in particular easy to produce separately as a structure or shape somewhat complex, and this by carrying out only one assembly operation by welding, which could be generally carried out in one plane, and hence very easily.

Moreover, as a function of the overall complexities of the constituent portions 2, 3, arising from particular shapes and configurations not associated with the pipes 4, the inserts 8 can be defined by structural details and supplementary configurations which need only involve said portions 1 and 2, whilst being careful always to provide easy and rapid mounting of said insert 8 in the lower portion 2.

As shown in FIGS. 2 (2A to 2C) of the accompanying drawings, relative to FIG. 1, each insert 8 comprises, on the one hand, a first tubular portion 8' forming alone the circumferential wall of a portion of the pipe 4 near its outlet, and, on the other hand, a second portion 8" having an open surface and forming substantially the internal longitudinal half wall of a more curved portion of said pipe 4, opening into the chamber 5 of said manifold or distributor 1, said insert 8 having the general shape of a swan's neck whose geometry is adapted to that of the recess 10 that receives it, to obtain by complementarity, shapes of a pipe 4 with a constant or variable cross-section.

The first tubular portion 8' will permit rigidifying the structure of the insert 8, promoting its moldability and increasing the dimensional precision, both at the level of the production phase of said insert 8 and during its positioning in the distributor intake 1.

The open shape and the flexible structure of the second upper portion 8" permits resilient deformation of the insert 8 in the direction of insertion and hence a blocking in position by compression in the same direction during assembly of the two constituent portions 2 and 3.

In the particular case of a pipe 8 of rectangular or square cross-section, said second upper portion 8" could constitute the internal wall and half of each of the two side walls (taken relative to the curvature of the pipe in question).

Moreover, the end of said second portion 8" which opens into the chamber 8 of the manifold or distributor 1 could have wall edges 8"" flaring outwardly to promote the intake of air into the corresponding pipe (the portion of wall 7' of the upper portion 3 could comprise an internal configuration having a similar flare).

According to one characteristic of the invention, shown particularly in FIGS. 1 to 3 of the accompanying drawings, the lower tubular portion 8' of each insert 8 is seated by its free end in a corresponding recess portion 10', delimited by the wall of the lower portion 2 and an internal retention wall 11, and rests, with internal circumferential flushness, on a portion of conduit 6 formed in the lower portion 2 of the manifold or distributor 1 and constituting the outlet end portion of the pipe 4 in question.

There is thus obtained, in the direction of the outlet of the pipes 4, a zone presenting a double skin or envelope ensuring increased rigidity, promoting the flow of air before the inlet end of the cylinder by the absence of discontinuity in the passage section, whilst guaranteeing a mechanical holding by suitable insertion.

So as to guarantee holding in position of the insert 8 over all its height and an absence of discontinuity of cross-section between the portions of pipes 4 formed by the envelope 10 and those formed by the corresponding insert 8 which is received in this latter, the walls of each reception recess 10 for the insert 8 comprise an imprint 12 corresponding to the external shape of said insert 8 and in that the wall zones 7" and 6" of the upper and lower portions 3 and 2 of the manifold or distributor forming said imprint 12 and in contact with the insert 8 in question, are located retracted relative to the wall portions 6, 6'; 7, 7' constituting a portion of the wall of the pipe 4 and the outlet end portion of this latter, the height of the offset 13, 13' between said zones and wall portions being locally substantially equal to the local thickness of the wall of the insert 8.

The dimensions of the insert 8 could be preferably, particularly in the longitudinal direction of the pipes 4 to be formed, slightly superior to those of the impressions 12 of the corresponding recesses 10, so as to obtain a slight compression of said inserts after assembly of the constituent parts 2 and 3 of the manifold or distributor 1.

To facilitate the emplacement of the inserts 8 in the lower portions 2, there may be provided shapes and configurations giving rise to self-positioning of the inserts during their insertion and a sealed mounting by association of conjugated shapes between said inserts 8 and the recess portions 10' of the lower walls 2.

According to a preferred modified embodiment of the invention, to achieve the mentioned object, the circumferential offset 13' constituting the upper edge of the outlet end portion 6 of the pipe 4 and on which rests the free end of the tubular portion 8', of the insert 8, has a shape defined by two transverse cutting planes, inclined relative to each other at an obtuse angle, with secants at the interior of the shape of the pipe 8, the edge 8'" of the free end of the tubular portion 8' of the insert 8 having a suitable complementary profile.

In the case of a pipe with a rectangular or square cross-section, the mentioned measure will lead to two opposite side walls whose edges 8'" will have a length greater at the center and shorter lengths on the sides, to constitute a shape with a rounded point (a profile of a complementary shape being also possible—longer on the sides and shorter at the center), the two other opposite side walls of said insert 8 having a section surface inclined relative to the external surfaces of said walls (see FIGS. 1, 2A and 2C).

Moreover, this measure will permit avoiding any emplacement through inserts 8 during their mounting (straightening function), to arrive automatically at a precise final position and will prevent any rotation or offset of the insert 8 during eventual assembly by welding, by vibration of the constituent portions 2 and 3.

According to another characteristic of the invention, shown particularly in FIGS. 1, 2 and 4 of the accompanying drawings, the second upper portion 8" of insert 8 is prolonged, adjacent the end of the pipe 4 opening into the chamber 5 of said manifold or distributor 1, by a strip of wall 14, in the form of a handle and arching locally over the open surface of said second upper portion 8" to form a closed circumferential segment of said pipe 8, which is received with lateral blocking in an impression 14' of a corresponding shape provided in the wall of the upper portion 3 of said manifold or distributor 1.

Preferably, the inserts 8 and their corresponding reception recesses 10 could be, as already indicated above, shaped and dimensioned such that, in the assembled condition, each insert 8 is blocked in position under resilient force from opposite sides, on the one hand, of the first tubular portion 8' against the lower portion 2 of said manifold or distributor 1, and, on the other hand, of the strip of wall 14 in the form of a handle on the upper portion 3 of said manifold or distributor 1.

It will also be noted that the possibilities of resilient deformation of the strip of wall 14 permit play in the assembly of the parts 2 and 3, without thereby compromising the blocking of the insert 8, and hence the sealing in the absence of vibration for the composite pipes 8.

Thus, the compression of said strip of wall 14 (because of an over-dimensioning of the insert 8 relative to the impression 12, 14') will generate a spring effect locking the mounting by insertion, ensuring the stability of said insert 8 and preventing play and noise after assembly of the parts 2 and 3.

Moreover, the reception of the insert 8 in an impression of corresponding shape, permits obtaining a very good sealing by surface contact, as well as good continuity of the internal surface of the pipe.

Moreover, the over-dimensioning of the insert 8 relative to its reception impression can, moreover, lead, in the case of an assembly of constituent parts 2 and 3 by vibration welding, to simultaneous welding of certain portions of said insert 8 with adjacent regions and in intimate contact with said parts 2 and 3.

As shown in FIG. 3 of the accompanying drawings, the internal surfaces of the walls of the reception recesses 10 of the inserts 8 of the lower portion 2 and/or of the upper portion 3 of said manifold or distributor 1 comprise preferably, on portions of opposite walls, ribs 15 projecting inwardly and extending in a direction substantially parallel to the direction of mounting by insertion of the insert 8 in the lower portion 2 of said manifold or distributor 1, adapted to provide a locking by compression and, as the case may be, by resilient deformation of the walls of the lower portion 8' and/or the upper portion 8" of said inserts 8, said ribs 15 having as the case may be variable heights, as a function of the capacity for local resilient deformation of the wall of the corresponding inserts 8.

Moreover, the wall of the recess portion 10' of the upper portion 2 could comprise on its internal surface a throat or a groove extending below the joint line 9 and adapted to gather the melted material resulting from the assembly by vibration welding of the parts 2 and 3.

According to a supplemental characteristic, the walls of the first and second portions 8' and 8" of each insert 8 are prolonged, on their external side surfaces, by projections 16 in the form of flexible opposed plates, increasing the contact surface between the insert 8 and the side walls of the reception recesses 10 and contributing, at least by certain of their edges, to the blocking in position of the insert 8 in its recess 10, said plates 16 extending, after mounting of the insert 8, at least to the joint plane or joint line 9 of the lower part 2 and upper part 3 of said manifold or distributor 1, but without rejoining the free end of the second portion 8' of the insert 8 opening into the chamber 5 of said manifold or distributor 1 (to preserve the flexibility and resilience of said second portion 8").

It will be noted particularly that the lower portion 16' of the forward edge of said plates 16 could come into abutment, during insertion of the insert 8 against the holding plate (FIGS. 1 and 2A and 2C).

Moreover, said opposite plates 16 could serve as a device for covering irregularities, rigidifying the part of the inserts of which they constitute projections and taking part positively in holding the inserts in the recess portions 10', by compensating for possible undesirable effects of play and existing tolerance between the different portions to be assembled.

Moreover, it will be noted that, in the case of an assembly of the parts 2 and 3 by vibration welding, the material melted at the level of the joint line 9 could enter into contact with the insert 8 and thereby ensure also the assembly by welding of this latter with said portions 2 and 3 (simultaneous assembly of at least three pieces in a single operation).

The present invention also has for its object a simplified process for production of an intake manifold or distributor 1 integrating several pipes 4 into its structure, particularly of thermoplastic material, by assembly of two prefabricated parts 2 and 3.

This process is principally characterized in that it consists in supplying a lower portion 2 and an upper portion 3 forming a cover, delimiting by coaction recesses 10 for pipes 8, to be mounted by insertion into portions 10' of said recesses 10 located in the lower portion 2 of the manifold or distributor 1 of the structural inserts 8, then in assembly by vibration the upper portion 3 on the lower portion 2 particularly along a peripheral joining or welding line 9, by blocking the inserts 8 in their recess 10 by compression between the upper portion 3 and lower portion 2, each pipe 4 being constituted by the coaction of at least one wall portion 6, 6'; 7, 7' of at least one of said two constituent portions 2 and 3 with a corresponding insert 8 of corresponding shape.

The different arrangements and characteristic set forth above with respect to the manifold or distributor 1 could of course as the case may be also find application in the field of the mentioned process of production.

Of course, the invention is not limited to the embodiment described and shown in the accompanying drawings. Modifications remain possible, particularly as to the construction of the various elements or by substitution of technical equivalents, without thereby departing from the scope of protection of the invention.

We claim:

1. Intake manifold or distributor, particularly of thermoplastic material, obtained by assembly of at least two preformed constituent parts and comprising several intake pipes formed with said manifold or distributor, each intake pipe (4) being at least partially constituted by the coaction of at least one wall portion (6, 6'; 7, 7') of at least one of the constituent parts (2, 3) with a structural insert (8), mounted in one of said parts (2, 3) before their mutual assembly, held in position between them after their assembly, and forming at least a portion of the wall of the pipe (4), the walls of the constituent parts forming reception recesses for the insert, and constituting a portion of the walls of the pipes, complementary in shape to the portion of the walls of the pipes formed by the insert.

2. Manifold or distributor according to claim 1, characterized in that it is constituted by two parts, namely a lower part (2) and an upper part (3), assembled by welding along a peripheral joint line (9) belonging to an assembly surface, flat or not, this latter passing substantially transversely through the intake pipes (4) which extend into the two constituents parts (2 and 3).

3. Manifold or distributor according to claim 2, characterized in that each said insert (8) comprises, on the one hand, a first tubular portion (8') forming itself the circumferential wall of a portion of the pipe (4) adjacent its outlet and, on the other hand, a second portion (8") having an open surface and forming substantially the longitudinal internal half wall of a more curved portion of said pipe (4), opening into the chamber (5) of said manifold or distributor (1), said insert (8) having a general swan neck shape whose geometry is adapted to that of the recess (10) receiving it to obtain shape-matingly the pipe (4) with a constant or variable cross-section.

4. Manifold or distributor according to claim 3, characterized in that the first tubular portion (8') of each said insert (8) is inserted by its free end into a corresponding recess portion (10'), delimited by the wall of the lower portion (2) and an internal retention wall (11), and rests, with internal circumferential flushness, against a conduit portion (6) formed in the lower portion (6) of the manifold or distributor (1) and constituting the outlet end portion of the pipe (4) in question.

5. Manifold or distributor according to claim 3, characterized in that the walls of each reception recess (10) for the insert (8) comprise an impression (12) corresponding to the external shape of said insert (8) and in that the wall regions (7" and 6") of the upper portion (3) and lower portion (2) of the manifold or distributor (1) forming said impression (12) and in contact with the insert (8) in question, are located withdrawn relative to the wall portions (6, 6'; 7, 7') constituting a portion of the wall of the pipe (4) and the outlet end portion of the pipe, the height of the offset (13, 13') between said regions and wall portions being locally substantially equal to the local thickness of the wall of the insert (8).

6. Manifold or distributor according to claim 5, characterized in that the circumferential offset (13') constituting the upper edge of the outlet end portion (6) of the pipe (4) and on which rests the free end of the tubular portion (8') of the insert (8), has a profile defined by two transverse cut planes, inclined relative to each other at an obtuse angle and secants to the interior of the contour of the insert (8), the edge (8''') of the free end of the tubular portion (8') of the insert (8) having a corresponding complementary profile.

7. Manifold or distributor according to claim 3, characterized in that the second upper portion (8") of the insert (8) is prolonged, adjacent the end of the pipe (4) opening into the chamber (5) of said manifold or distributor (1), by a strip of wall (14), in the shape of a handle and locally arching over the open surface of said second upper portion (8") to form a closed circumferential segment of said pipe (8), which is received with lateral blocking in an impression (14') of a complementary shape provided in the wall of the upper portion (3) of said manifold or distributor (1).

8. Manifold or distributor according to claim 7, characterized in that, in the assembled condition, each said insert (8) is blocked in position with resilient force by opposite bearing portions, on the one hand, of the first tubular portion (8') against the lower portion (2) of said manifold or distributor (1) and, on the other hand, of the strip of wall (14) in the form of a handle on the upper portion (3) of said manifold or distributor (1).

9. Manifold or distributor according to claim 2, characterized in that the internal surfaces of the walls of the reception recesses (10) of the inserts (8) of at least one of the lower part (2) and the upper part (3) of said manifold or distributor (1) comprise, ribs (15), projecting inwardly and extending in a direction substantially parallel to the direction of mounting by insertion of the insert (8) into the lower portion (2) of said manifold or distributor (1), adapted to provide a locking by compression, and, as the case may be, by resilient deformation of the walls of at least one of the lower portion (8') and a portion (8") of said inserts (8), said ribs (15) having, as the case may be, variable heights, as a function of the local resilient deformation capacity of the wall of the corresponding inserts (8).

10. Manifold or distributor according to claim 3, characterized in that the walls of the first and second portions (8' and 8") of each insert (8) are prolonged, on their external side surfaces, by projections (16) in the form of flexible opposed plates, increasing the surface contact between the insert (8) and the side walls of the reception recesses (10) and contributing, at least by certain of their edges, to the blocking in position of the insert (8) in its recess (10), said plates (16) extending, after mounting of the insert (8), at least to the joint plane or joint line (9) of the lower portion (2) and upper portion (3) of said manifold or distributor (1), but without meeting the free end of the second portion (8") of the insert (8) opening into the chamber (5) of said manifold or distributor (1).

11. Process for the production of an intake manifold or distributor integrating several pipes in its structure, particularly of thermoplastic material, by assembly of two prefabricated portions, characterized in that it consists in providing a lower portion (2) and an upper portion (3) forming a cover, delimiting by coaction recesses (10) for structural inserts (8), to be mounted by insertion into portions (10') of said recesses (10) located in the lower portion (2) of the manifold or distributor (1) of the structural inserts (8), then assembling by vibration the upper portion (3) on the lower portion (2) particularly along a peripheral joining or welding line (9), by blocking the inserts (8) in their recesses (10) by compression between the upper portion (3) and the lower portion (2), each said pipe (4) being constituted by the coaction of at least one wall portion (6, 6'; 7, 7') of at least one of said two prefabricated portions (2 and 3) with a said corresponding structural insert (8) of complementary shape.

12. An intake manifold comprising:

a first casing half;

a second casing half connected to the first casing half along respective mating edges of the first and second halves; and an insert disposed between the first and second casing halves so that the insert is held in place by direct contact with both the first and second casing halves;

wherein the insert and interior surfaces of the first and second casing halves define a continuous pipe through the manifold.

13. The manifold of claim 12, wherein a first cross section of the pipe is defined entirely by the insert and the first casing half.

14. The manifold of claim 13, wherein a second cross section of the pipe is defined entirely by the insert and the second casing half.

15. The manifold of claim 14, wherein a third cross section of the pipe is defined entirely by the insert.

16. The manifold of claim 12, wherein a first cross section of the pipe is defined entirely by the insert.

* * * * *